United States Patent [19]
Jost

[11] Patent Number: 4,821,581
[45] Date of Patent: Apr. 18, 1989

[54] METHOD AND APPARATUS FOR THE CONTINUOUS MEASURING OF BULK MATERIAL PASSING OVER A MEASURING WHEEL

[75] Inventor: Gerhard Jost, Muehltal, Fed. Rep. of Germany

[73] Assignee: Carl Schenck AG, Darmstadt, Fed. Rep. of Germany

[21] Appl. No.: 94,816

[22] Filed: Sep. 9, 1987

[30] Foreign Application Priority Data

Oct. 3, 1986 [DE] Fed. Rep. of Germany ....... 3633694

[51] Int. Cl.$^4$ .............................................. G01F 1/80
[52] U.S. Cl. .................................................. 73/861.36
[58] Field of Search ............ 73/861.36, 861.37, 861.38

[56] References Cited

U.S. PATENT DOCUMENTS

| | | | |
|---|---|---|---|
| 2,771,773 | 11/1956 | Wallace | 73/861.38 |
| 2,775,125 | 12/1956 | Peaceman | 73/861.38 |
| 2,832,218 | 4/1958 | White | 73/861.38 |
| 3,331,244 | 7/1967 | Henderson | 73/861.38 |
| 4,700,578 | 10/1987 | Fassbinder | 73/861.37 |

FOREIGN PATENT DOCUMENTS

2544976 4/1977 Fed. Rep. of Germany .
3346145 2/1985 Fed. Rep. of Germany .
3327594 7/1985 Fed. Rep. of Germany .

*Primary Examiner*—Stewart J. Levy
*Assistant Examiner*—Robert P. Bell
*Attorney, Agent, or Firm*—W. G. Fasse; D. H. Kane, Jr.

[57] ABSTRACT

The quantity of a flow of bulk material passing over a measuring wheel is continuously measured by measuring the load r.p.m. of the wheel or of a motor driving the wheel and the power output torque of the motor. The resulting r.p.m. and torque values are used for calculating the quantity. Interfering influences are substantially eliminated by using a correction value in the calculation. The correction value is based on the inertia moment of all rotating components of the system and on variations in the load r.p.m. Load r.p.m. and power output torque measuring devices provide data to a microprocessor for the calculations for achieving a high measuring precision even when the r.p.m. varies.

12 Claims, 2 Drawing Sheets

METHOD AND APPARATUS FOR THE CONTINUOUS MEASURING OF BULK MATERIAL PASSING OVER A MEASURING WHEEL

FIELD OF THE INVENTION

The invention relates to a method for the continuing measuring of the conveying quantity of a bulk material flow passing over a measuring wheel driven by a motor. The invention also relates to an apparatus for performing this method.

DESCRIPTION OF THE PRIOR ART

German Patent Publication (DE-OS) No. 2,544,976 describes the continuous measurement of the conveying quantity of a bulk material flow in which the inertia force (Coriolis force) is utilized for the mass determination. This inertia force becomes effective when the mass particles are entrained by a rotating reference body which generally is a centrifugal type of wheel. For the entrainment the bulk material flow is applied in parallel to the rotational axis of the wheel, more specifically, to the guide vanes of the centrifugal wheel. The bulk material is thrown off the wheel primarily in a direction perpendicularly to the rotational axis of the centrifugal wheel. The torque moment of the centrifugal wheel rotating with a constant r.p.m., varies in accordance with the Coriolis force, whereby the torque moment change is approximately proportional to the mass of the bulk material flowing across the wheel. The power input of the driving electro-motor varies with the change of the torque moment. Thus, it is possible to measure the current input of the motor as a measure for determining the mass flow. However, since the relationship between the Coriolis force and the torque moment change is only an approximate one, this known device is suitable only for simple applications not requiring any high accuracy in the measurement of the bulk material quantity.

German Patent Publication (DE-OS) No. 3,327,594 describes a method for measuring a bulk material flow also employing a centrifugal wheel driven by a rigidly mounted three phase asynchroneous motor. The effective power input of the motor is measured and used for determining the mass flow of the bulk material. However, the precision of this method is not satisfactory due to measuring the effective power input and other factors because motor losses, motor characteristics, and so forth cause measuring errors which are even subject to disturbing or distorting influences such as the temperature and the power supply frequency.

German Patent Publication (DE-OS) No. 3,346,145 discloses a measuring apparatus for the continuous measuring of the weight of continuously flowing material streams in which a measuring wheel in the form of a winged wheel is driven by a motor running with a constant r.p.m. and mounted in the manner of a pendulum. The drive torque moment of the motor is used as the measuring value for ascertaining the conveyed quantity of bulk material. The precise ascertaining of the conveyed quantity requires that the r.p.m. of the measuring wheel is maintained constant. A synchroneous motor is used for maintaining the r.p.m. of the measuring wheel constant. The need for keeping the r.p.m. constant has basically several disadvantages. If an asynchroneous motor is used as the drive motor, it is necessary to control the r.p.m. for compensating any load dependent changes in the slip of the asynchroneous motor. If a synchroneous motor is used, the r.p.m. depends on the frequency of the power supply network. Frequency changes in compound power supply networks are of lesser significance. However, there are many power supply systems for which it must be assumed that the frequency changes substantially at least for short time durations.

OBJECTS OF THE INVENTION

In view of the foregoing it is the aim of the invention to achieve the following objects singly or in combination:

to provide a method for the measuring of the quantity of a flow of bulk material in such a way that disturbing influences can be eliminated by simple means to assure a measuring precision or accuracy as high as possible;

to take the r.p.m. of any kind of motor driving the measuring wheel, into account when calculating the mass flow rate;

to compensate for variations in the r.p.m. to assure a highly precise measurement even if r.p.m. variations occur; and to provide an apparatus and circuit arrangement suitable for performing the present method.

SUMMARY OF THE INVENTION

The method according to the invention is characterized in that the power output or torque moment of the drive motor of the measuring wheel is measured to provide one value for the calculation of the bulk material flow rate or quantity and to also measure the load r.p.m. of the drive motor or of the measuring wheel to provide another value for the calculation of the flow rate or flow quantity. More specifically, a signal or value representing the power output or torque moment is multiplied with the reciprocal or inverted value of a signal or value representing the load r.p.m.

The apparatus according to the invention is characterized in that it comprises a measuring wheel over which the bulk material is caused to flow and which is driven by a drive motor, the output power of which is measured by a torque sensor. The apparatus further comprises an r.p.m. sensor which senses either the load r.p.m. of the motor or of the measuring wheel. An evaluating unit which is controlled by a microprocessor has one input to receive the output of the drive motor and another input to receive a signal representing a measured load r.p.m.

By measuring the power output or torque moment, and the load r.p.m. of the motor or of the measuring wheel, the present method can be performed by relatively simple components while assuring nevertheless, an especially high measuring precision.

According to the invention the measuring wheel can be driven by any kind of motor and the measured values of the load r.p.m. are taken into account as instantaneous values so that each measurement is based on the r.p.m. coinciding with the measurement. Thus, the precision of the measurement is not adversely affected by disturbing influences.

The high precision of the present method may be assured even when the r.p.m. varies considerably by taking into account in the calculation, the angular acceleration and the inertia moments of all rotating components of the apparatus including the rotating components of the motor and of the measuring wheel.

Another advantage of the invention is seen in that a standard asynchroneous motor can drive the measuring wheel without any r.p.m. control. A standard asynchroneous motor has, as compared to a reluctance or r.p.m. controlled asynchroneous motor, a substantially lower dissipation loss. As a result, the standard asynchroneous motor operates at lower temperatures, especially surface temperatures. This feature has substantial advantages, especially where the present measuring apparatus must be constructed to meet dust explosion preventing requirements. Nevertheless, the present method and apparatus can use a synchroneous motor as well, especially where the r.p.m. cannot be maintained sufficiently constant, for example, where the power supply network itself does not maintain a constant frequency.

The present measuring system achieves very high precisions and the attained precision is not adversely affected by frequency changes and voltage variations in the power supply.

In one embodiment of the invention an asynchroneous motor drives the measuring wheel and the motor is mounted in the manner of a pendulum for measuring the power output or torque moment by means of a lever arm operatively connected to a torque moment measuring device which provides a respective signal value. However, it is not necessary to mount the asynchroneous drive motor in the manner of a pendulum. Such an asynchroneous drive motor may also be mounted in a fixed position in which case the shaft of the motor is connected to a suitable torque moment sensor for providing the respective power output signal.

The load r.p.m. is measured, for example, by providing the measuring wheel with markings which are sensed by an inductive proximity sensor. Such a sensor is capable of measuring the r.p.m., for example, at 0.1 second intervals.

The signals obtained as described above for the power output or torque and for the load r.p.m. and any further parameters such as the inertia moment of all rotating components and the angular acceleration of the measuring wheel, are supplied to a microprocessor controlled data processing circuit which receives the torque representing signal and the load representing r.p.m. signal continuously and accordingly processes these signals continuously.

The above mentioned multiplication of the power output or torque moment value with the reciprocal value representing the load r.p.m. can be performed with known analog or digital circuit components.

The above mentioned compensation values representing the inertia moment of the rotating components and the angular acceleration value are processed to perform a correction value for calculating the flow quantity of the bulk material. The inertia moment of the rotating components of the apparatus provides, in response to changes in the r.p.m., that is, in response to angular accelerations, a correction moment which must be deducted from the measured power output or torque value when the r.p.m. rises and which must be added to the measured power output or torque when the r.p.m. is falling or decreasing.

BRIEF DESCRIPTION OF THE DRAWINGS

In order that the invention may be clearly understood, it will now be described, by way of example, with reference to the accompanying drawings, wherein.

Figure 1:
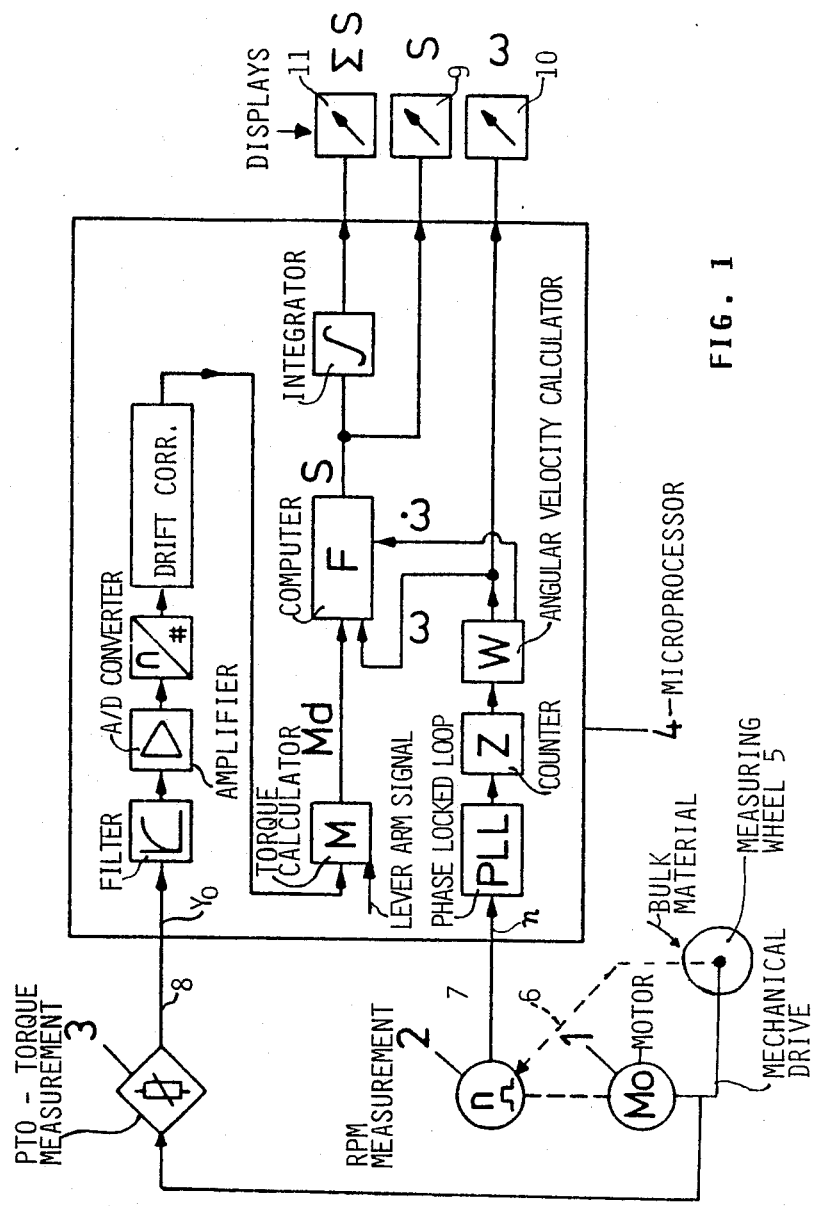
FIG. 1 is a block circuit diagram of the present signal processor, of the means for sensing the power output or torque moment of the drive motor, and for measuring the r.p.m.

DETAILED DESCRIPTION OF PREFERRED EXAMPLE EMBODIMENTS AND OF THE BEST MODE OF THE INVENTION

A drive motor 1 drives the measuring wheel 5 in a conventional manner. The load r.p.m. of the motor 1 is measured by a conventional tachometer 2 either directly at the motor output shaft or the load r.p.m. can be measured at the wheel 5 as indicated by the dashed line 6. The signal at the output of the tachometer is supplied through a conductor 7 to a data processing computer circuit 4. The power output or torque is measured by a conventional torque meter 3 to produce a signal supplied through a conductor 8 to the computer circuit 4 which may be a microprocessor. The torque measuring device 3 is a conventional force sensor, for example, a dynamometer. If the motor 1 is rigidly mounted, the torque sensing meter 3 can be a simple torque sensor. The torque representing signal on the conductor 8 is supplied to a conventional filter, the output of which is amplified and passed through an analog-to-digital converter, the output of which passes through a drift correction circuit DC which functions as follows. An input amplifier circuit of the drift correction circuit has an input which is alternately connected to a zero voltage or to a known reference voltage. Since the reference voltage is known it is possible to calculate the actual amplification from the reference value measurement and from the zero measurement.

The output of the drift correction circuit is passed to a torque calculating circuit M, the output of which provides a power output value Md supplied to one input of a computer circuit F. The computer circuit F calculates an output signal S representing the instantaneous flow quantity flowing over the wheel, as follows:

$$S = Md/\omega R^2 - \theta/R^2 \cdot \dot{\omega}/\omega$$

wherein $\omega$ and $\dot{\omega}$ are as explained below, wherein $\theta$ is the inertia moment of the rotating parts including the wheel 5, and wherein R is the outer radius of the measuring wheel 5.

The torque calculator M calculates the power output torque of the drive motor 1 in a known manner by multiplying the signal from the drift correction circuit and a signal from a lever arm to which the motor 1 is mounted in a pendulum type manner.

The r.p.m. representing signal n on the conductor 7 is supplied to a phase locked loop circuit of conventional construction. The output of the phase locked loop circuit PLL is supplied to a counter Z which digitizes the load r.p.m. signal. The counted and digitized signal is supplied through an angular velocity calculator W which calculates the angular velocity $\omega$ and the angular acceleration $\dot{\omega}$ of the measuring wheel 5.

These two signals are also supplied to the computer circuit F which calculates from the output torque Md from the motor 1 and from the r.p.m. or angular velocity $\omega$ or the reciprocal value $1/\omega$ and, is desired, from the angular acceleration $\dot{\omega}$ a value S which represents the instantaneous conveying quantity, for example, in kilograms per hour.

Values for providing a correction are stored in the memory of the computer F. Such values include the inertia moment of all rotating components of the motor 1 and the wheel 5. The computer F calculates the correction value from the angular acceleration ω and from the stored inertia moments. Thus, the value S may be corrected. The signal S may be indicated in an indicator S which, for example, displays the instantaneous flow quantity. By passing the signal S through an integrator, and displaying the integrated signal in respective display 11 the total flow quantity may be provided. Also, the r.p.m. may be directly indicated by an indicator 10.

A microprocessor 4 suitable for the present purposes is, for example Model Z 80, an 8 bit processor made by the Zilog Company.

The output signal S can be used in a feedback loop which may either be opened or closed for controlling the drive motor of a starfeeder, for example, when determined quantities must be dosed for all kinds of purposes.

Figure 2:
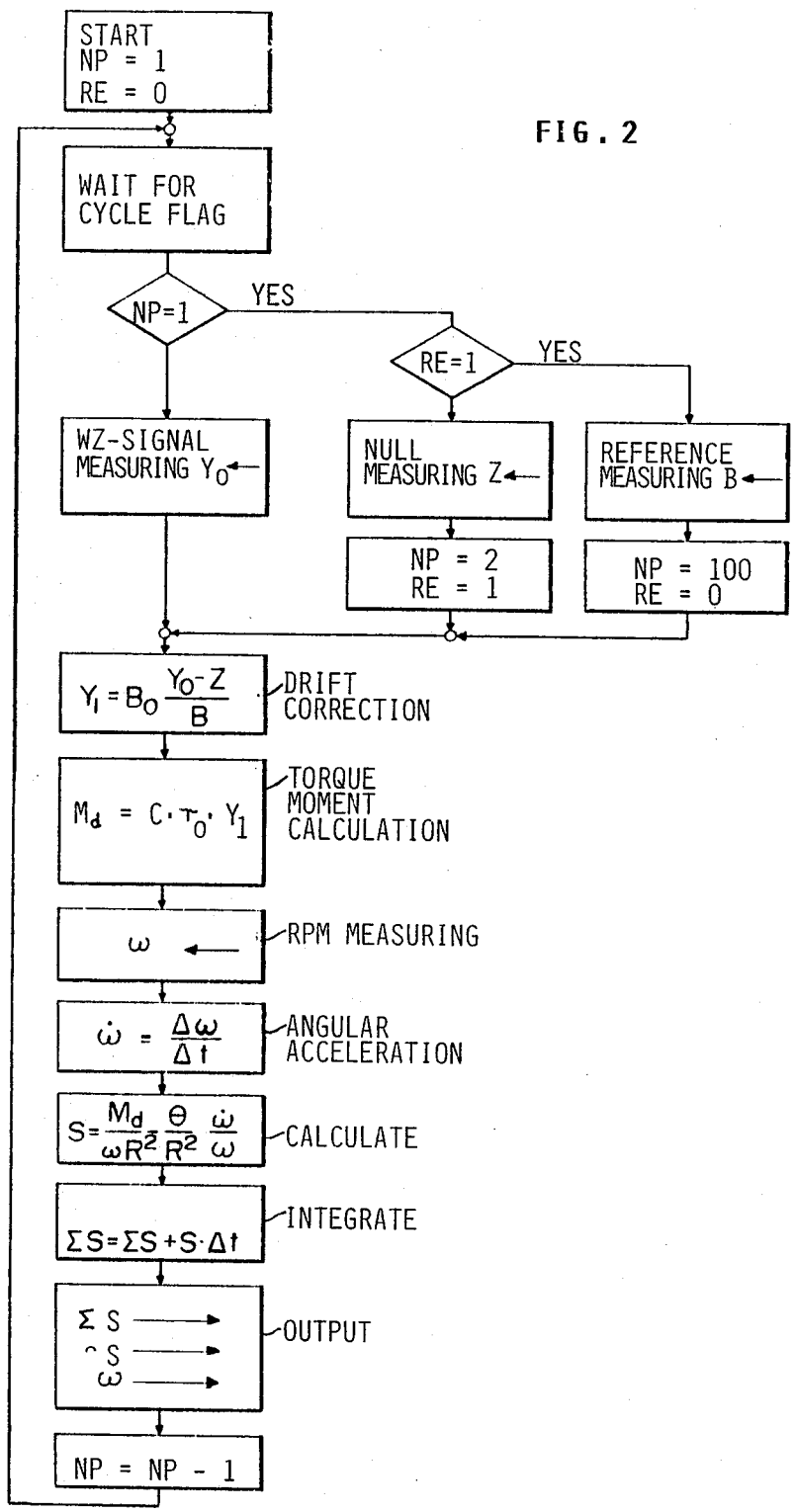
FIG. 2 is a flow diagram of the operation of the block circuit diagram of claim 1.

The flow diagram shown in FIG. 2 explains the operation of the block diagram of FIG. 1. As mentioned above, the microprocessor 4 may be Model Z80A made by Zilog which is an 8 bit conventional processor. The measurements and signal processing are realized by the program represented by the flow diagram. The r.p.m. (n) of the motor 1 is measured by the tachometer 2 and the angular velocity ω is calculated by the calculator W. The torque measurement device 3 functions as a weighing cell providing the signal $Y_0$ to the input of the filter in FIG. 1. During a signal correction cycle, instead of signal $Y_0$, the null reference signal Z or a reference voltage B are measured. For the further calculations the following constant values are required, namely the reference value $B_0$ when a zero or nulladjustment has been made, the sensitivity C of the system, the lever arm τ of wheel 5, the inertia moment θ of all rotating parts, and the radius R of the measuring wheel 5. The following values are calculated, namely the corrected measured value $Y_1$, the torque moment Md, the angular acceleration $\dot{\omega}$, the instantaneous quantity or material stream thickness S on the wheel 5, and the conveyed or sum quantity ΣS.

The following abbreviations are used.
NP=loop counter
RE=reference measuring flag
WZ=weighing or load cell
$Y_0$=load cell (WZ) signal
Z=null reference signal
B=reference voltage
$Y_1$=corrected measured value
$B_0$=adjusted signal
Md=torque moment
C=measuring system sensitivity
τO=lever arm of wheel 5
ω=angular speed
$\dot{\omega}$=angular acceleration
R=outer radius of wheel 5
θ=inertia moment
S=instantaneous quantity
ΣS=sum quantity
n=r.p.m.

Although the invention has been described with reference to specific example embodiments, it will be appreciated, that it is intended to cover all modifications and equivalents within the scope of the appended claims.

What I claim is:

1. A method for continuously measuring of the quantity of bulk material passing through a measuring station, comprising the following steps:
    (a) driving a measuring wheel by means of a motor,
    (b) passing bulk material over said measuring wheel,
    (c) measuring a load r.p.m. to provide a load r.p.m. representing first signal,
    (d) measuring the power output torque of said motor to provide a power output torque representing second signal,
    (e) forming an inverse or reciprocal value of said first signal,
    (f) calculating said inverse or reciprocal value with said second signal to produce a bulk material quantity representing value, and
    (g) ascertaining any variation in said load r.p.m. by measuring the respective angular acceleration (ω) to provide a load r.p.m. variation value, ascertaining the inertia moment of any rotating components to provide an inertia moment value, forming a correction value from said inertia moment value and from said load r.p.m. variation value, and using said correction value in said calculating step for producing said quantity representing value.

2. The method of claim 1, wherein said load r.p.m. is measured at a power output of said motor.

3. The method of claim 1, wherein said load r.p.m. is measured as the r.p.m. of said measuring wheel.

4. The method of claim 1, wherein said calculating step is performed by multiplying said reciprocal value with said second signal.

5. The method of claim 1, wherein said step of measuring the load r.p.m. and said step of measuring said power output torque are performed continuously, and wherein said calculating step is also performed continuously on the basis of said continuous measuring.

6. The method of claim 1, wherein said step of measuring the load r.p.m. is performed at sufficiently short time intervals.

7. An apparatus for continuously measuring the quantity of bulk material, comprising a measuring station including a measuring wheel for passing said bulk material over said measuring wheel motor means operatively connected to said measuring wheel for continuously rotating said measuring wheel, first means connected to a power output of said motor means for measuring a power output torque to provide a respective torque value, second means for measuring a load r.p.m. for providing a respective load r.p.m. value, computer means connected to receive said torque value and said load r.p.m. value for calculating a bulk material quantity representing value from said torque value and from said load r.p.m. value, said computer means comprising means for forming a load r.p.m. variation representing value representing an angular acceleration ($\dot{\omega}$), means for storing an inertia moment value representing an inertia moment of any rotating components of said apparatus, and means for forming from said load r.p.m. variation representing value and from said stored inertia moment value a correction value which is taken into account when calculating said bulk material quantity representing value.

8. The apparatus of claim 7, wherein said second load r.p.m. measuring means are connected to an output of said motor means.

9. The apparatus of claim 7, wherein said second load r.p.m. measuring means are connected to said measuring wheel.

10. The apparatus of claim 7, wherein said computer means comprise a microprocessor.

11. The apparatus of claim 7, further comprising pendulum type mounting means for supporting said motor means, and wherein said pendulum type mounting means bear against said first means for measuring a power output torque.

12. The apparatus of claim 7, wherein said motor means comprise an asynchroneous electrical motor for driving said measuring wheel.

* * * * *